Oct. 31, 1950 M. H. ENGESSER 2,528,045
HAYRACK
Filed Aug. 14, 1947 4 Sheets-Sheet 2

Inventor
Miles H. Engesser

By Clarence A. O'Brien
and Harvey B. Jacobson
Attorneys

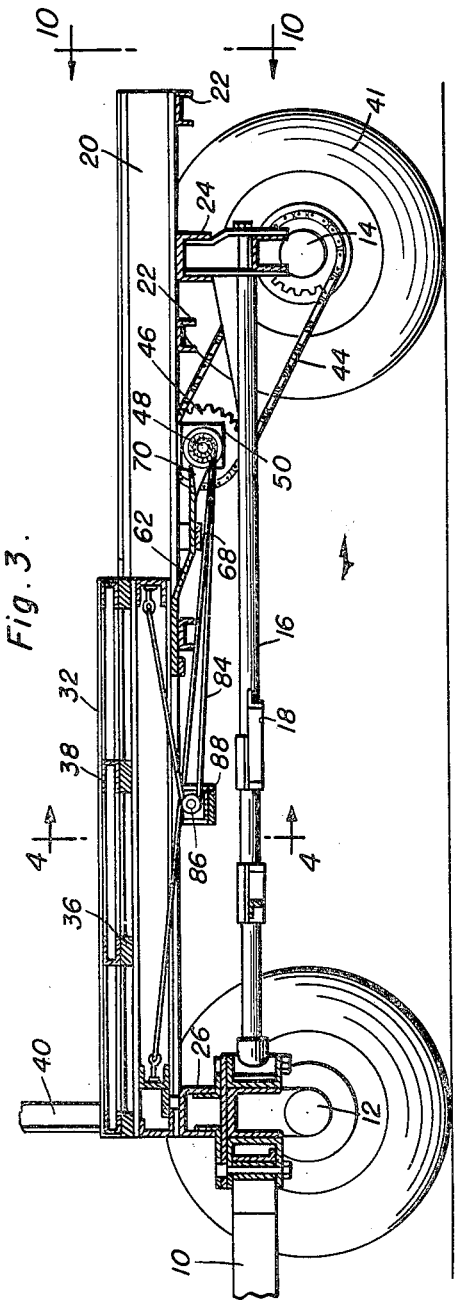

Oct. 31, 1950     M. H. ENGESSER     2,528,045
HAYRACK
Filed Aug. 14, 1947     4 Sheets-Sheet 4
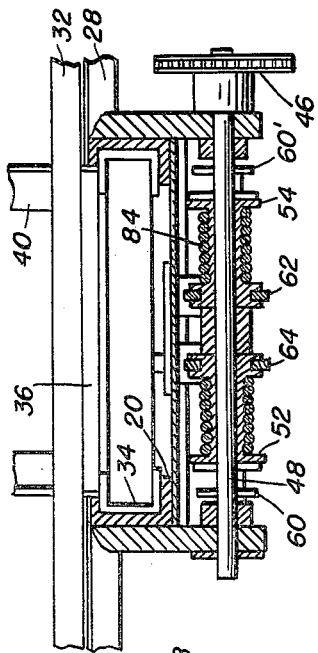
Fig. 9.
Fig. 8.
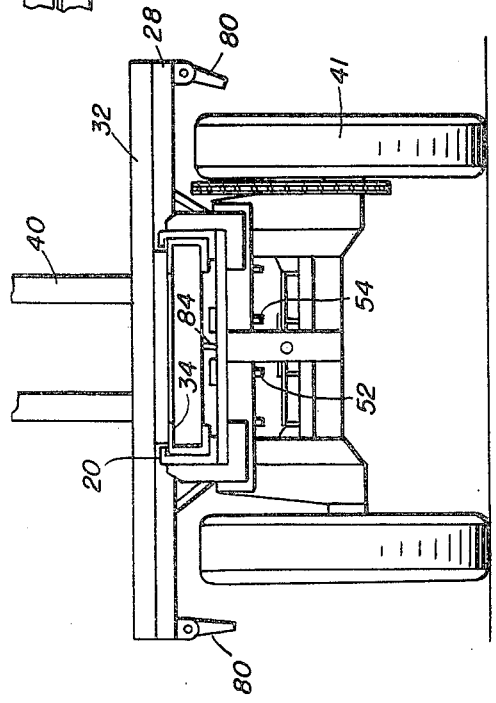
Fig. 10.
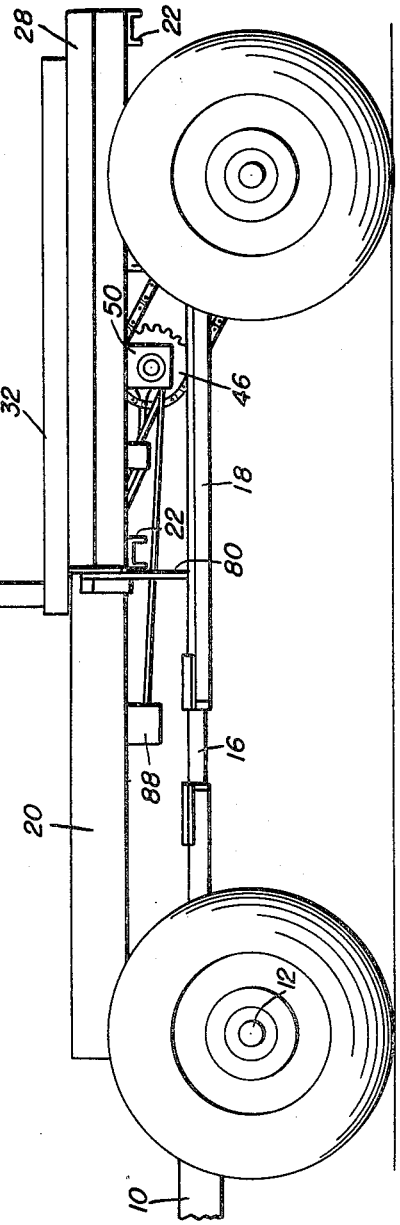
Inventor
Miles H. Engesser
By Clarence A. O'Brien
and Harvey B. Jacobson
Attorneys

Patented Oct. 31, 1950

2,528,045

UNITED STATES PATENT OFFICE 2,528,045

HAYRACK

Miles H. Engesser, Redwood, N. Y.

Application August 14, 1947, Serial No. 768,696

3 Claims. (Cl. 214—83.24)

This invention relates generally to agricultural implements, more particularly to a hay loading device comprising a wagon frame provided with a front rack slidably mounted on the frame and a fixed rear rack, together with power means operated by one of the wheels of the wagon frame to move the front rack forwardly and rearwardly, and other means for initiating the movement and for automatically arresting this movement.

A primary object of this invention is to provide a hay loading device which will greatly facilitate the loading of hay onto a rack, when hay is being harvested.

Another object, ancillary to the foregoing object, is to provide a hay loading device which is well adapted for use with mechanical hay loaders which deliver the hay from a windrow in the field to the rear of the wagon or rack upon which the hay is to be carried from the field to the stack or barn. Since such mechanical hay loaders deliver the hay only at the rear end of such conveyance, it is a great convenience for the operator if he can build the delivered hay entirely upon the rear portion of the wagon or rack. With this in mind, the instant invention provides a rack built in two sections, hereinafter referred to as a front rack and a rear rack, so that the front rack may be completely filled with hay and then moved to the forward end of the wagon frame whereon the racks are mounted, whereafter the rear rack may be filled with hay. Obviously, this system avoids the necessity of forking the hay from the rear portion of the hay loading device to the front end thereof.

Another object of this invention is to provide a hay loading device which will allow the more rapid loading of hay onto a rack, and considerably decrease the labor connected therewith.

Still another object of this invention is to facilitate the removal of the hay from the rack, as by the use of mechanical hay forks. This will be understood when it is noted that the load is divided into two halves. When the said mechanical fork is inserted into either the rear or front half of the load, the general efficiency of the fork is improved due to the prior division of the load.

And a still further object of this invention is to provide manual control means for initiating the movement of the front rack, at both sides of the wagon frame, this dual control feature increasing the safety and convenience with which the device may be operated. The automatic control means for arresting the movement of the front rack in both forward and rearward positions is of a novel and simple character which will not readily become inoperative.

And a last object to be specifically mentioned is to provide a device of this character which is relatively inexpensive and practicable to manufacture, extremely simple and convenient to use under various conditions, and which is generally efficient and durable in service.

With these objects in view, this invention comprises a novel combination, construction and arrangement of parts and portions as will be hereinafter described in detail in the specification, particularly pointed out in the appended claims, and illustrated in the accompanying drawings which form a material part of this application, and in which:

Figure 3 is a longitudinal vertical sectional view of the hay loading device;

Figure 4 is a vertical transverse sectional view, taken on the line 4—4 in Figure 2;

Figure 5 is an enlarged detail fragmentary view of a portion of the clutch mechanism and contiguous portions, taken on the line 5—5 in Figure 2;

Figure 6 is an enlarged fragmentary detail view of one end of an actuator fork used in association with the clutch mechanism;

Figure 7 is a bottom plan view, fragmentary in character, to illustrate the invention when the rear rack is in rearward position, the clutch mechanism being shown engaged and one cam end of an actuating lever being shown in the position when a cam engagement pin on the front rack is about to force this lever into a position releasing the clutch mechanism;

Figure 8 is a side elevational view of this invention, with the front rack disposed in rearward position, the view being taken from the left-hand side of the device;

Figure 9 is a vertical transverse sectional view through the clutch mechanism, and taken on the line 9—9 in Figure 2; and Figure 10 is a rear elevational view of the assembled device.

Similar characters of reference designate similar or identical parts and portions throughout the specification and throughout the several views of the drawings.

Figure 1:
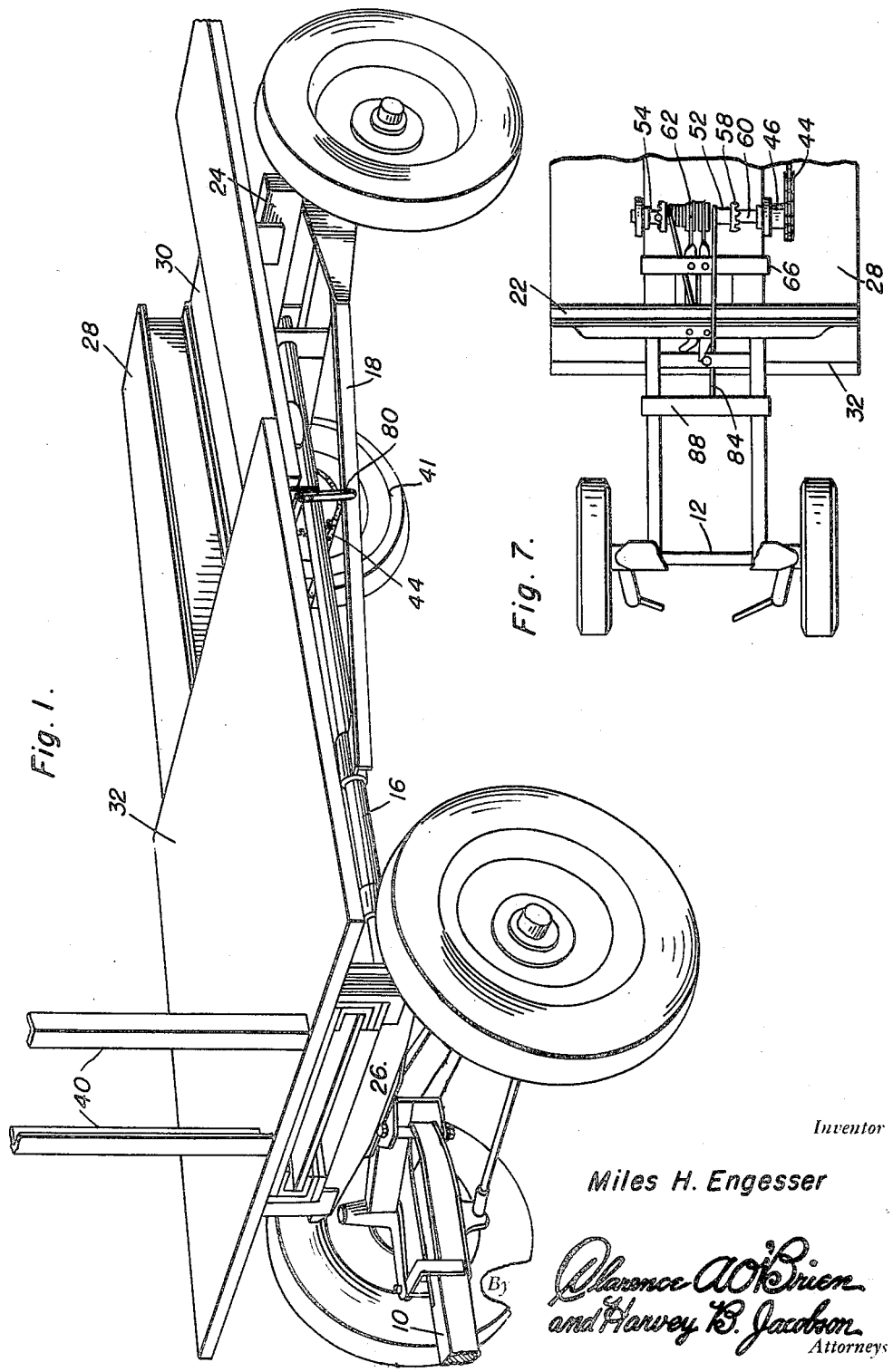
Figure 1 is a perspective view of the assembled device, with the front rack in the forward position.
Figure 2:
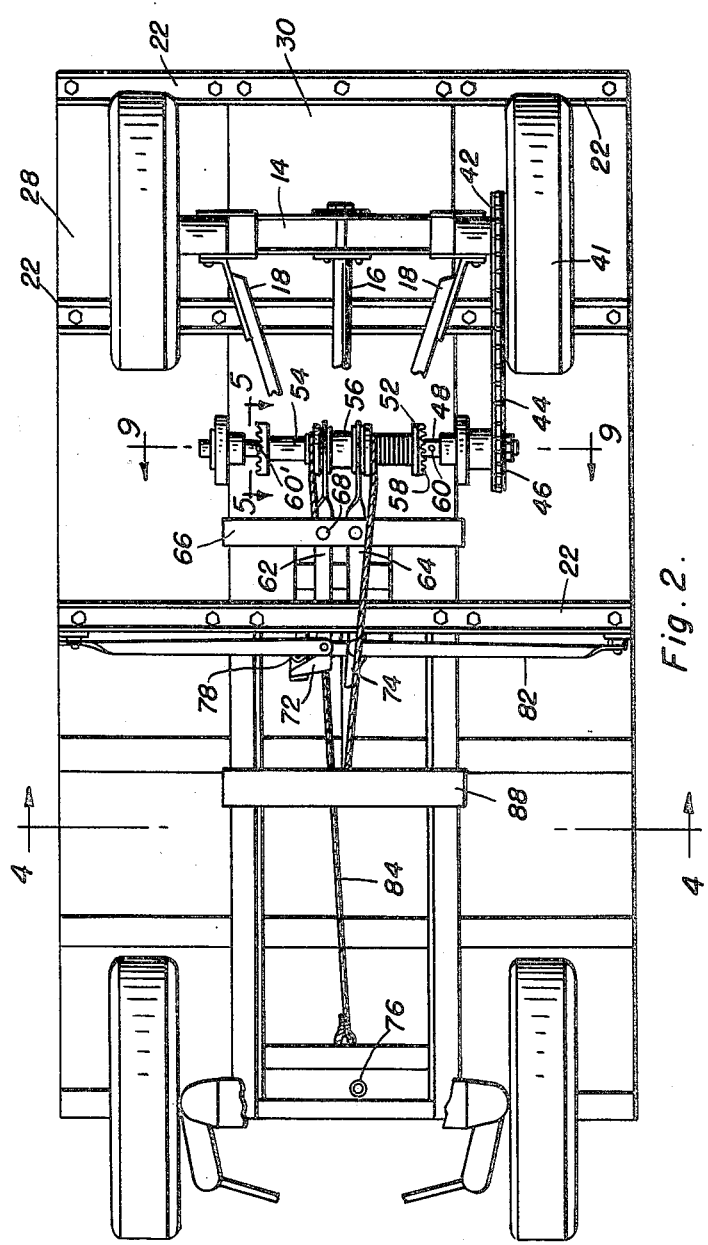
Figure 2 is a bottom plan view of the structure illustrated in Figure 1, with the front rack in the same position as illustrated in Figure 1, and with portions of the wagon frame broken away and the underlying portions shown in elevation, to better disclose the feature of the dual drum windlass mechanism used in this invention.

Referring now to the drawings in detail, this invention includes a wagon frame having a tongue 10, front axle 12, rear axle 14, a reach 16 with reach braces 18, and main frame members 20 of channel construction which extend in parallel relation the length of the implement and are supported on transverse channel irons 22 and a complement of bolster elements 24 and 26, associated with the frame at the rear and front axles, respectively.

The channel frame members 20 will ordinarily be welded directly to the said bolster constructions. The rear rack 28 is of comparatively simple construction, and comprises a pair of apron members extending horizontally laterally of the channel members 20 and supported thereon, and a central bed plate 30 secured to and between the channel members 20, it being understood that the transverse channel brace members 22 comprise important portions of framework for the rear rack.

The front rack 32 is of a dimension similar to that of the rear rack and is slidably mounted by means of a pair of channel members 34, to slide longitudinally within the channel frame members 20, a plurality of spacing members 36 being secured between the front rack 32 and the sliding channel members 34, so that the front rack may move over the top of the main frame channel members 20. A plurality of channel members 38 are disposed in spaced parallel relation in this front rack, which is, of course, covered by a flat panel of sheet metal. At the front end of the front rack, there is represented a pair of upright rack members 40, and it will be understood that the number of these upright rack members, ordinarily supplemented with horizontal cross members, will be a matter of individual preferment and mechanical expediency, this invention envisaging the provision of a wide variety of upright rack members adapted to retain the hay in place, but the character of these upright rack members is not material in this application.

The power to move the front rack is derived from one of the rear wheels 40 which is provided with a sprocket 42 and a sprocket chain 44 is entrained around this sprocket 42 and a sprocket 46 mounted on one end of the shaft 48 which is freely rotatably mounted in brackets 50 carried by the main frame channel members 20. The sprocket wheel 46 is rigidly secured on the rod 48 and this rod or shaft extends transversely of the machine above and in front of the rear axle 14. A pair of drums 52 and 54, with a spacer 56, are freely rotatably mounted on the shaft 48, and the outside ends of these drums are provided with a plurality of teeth 58 adapted to selectively engage diametrically disposed pins 60 which are rigidly secured to the shaft 48. It will be understood that the teeth 58 and pins 60 are provided in duplicate arrangement on each end of the windlass assembly comprised of the drums 52 and 54. A pair of actuating levers 62 and 64 are pivotally secured to the short transverse frame member 66 carried by the main channel frame members 20. The pivotal connections of these levers, illustrated at 68, may be of simple bolt character and each lever terminates in a fork 70, best illustrated in Figures 5 and 6, which frictionally engages annular channeled members carried by the drums 52 and 54. The forward ends of these levers 62 and 64 terminate in cam members 72 and 74 which coact with cam engaging pins 76 and 78 secured to the front end of the frame portion of the implement and to the central portion of the same frame, respectively. These members 76 and 78 may comprise rollers carried by axis pins, and it will be understood that when the front rack is moved into the fully extended forward position, the cam 74 will engage the member 76, causing the lever 64 to force the dual drum windlass assembly into neutral position, that is, with the drum 54 out of engagement with the pin 60'. It will be noted that the cam will move the drum assembly a limited distance and that the reversal of the movement of the front rack must be avoided by provision of means to hold the drum assembly in neutral position, such as spring biasing means to retain the spring drum assembly normally out of engagement with the pins 60 and 60'. This spring biasing means may be incorporated with the levers 62 and 64 and is not illustrated in the drawings. The cam 72 engages the pin member 78 when the front rack has travelled all the way to the rear of the implement and the lever 62 is thereby actuated to move the drum assembly in a direction for disengagement of the toothed portion of the drum 52 from the pin 60.

A pair of hand levers 80 are secured, one on either side of the implement, to one of the transverse channel members 22, and operatively connected to links 82, whereby the actuating levers 62 and 64 may be manually controlled from either side of the implement. It will be noted that when the device has been placed in neutral position by the action of either one of the cams 72 or 74, the hand levers 80 may be used to cause re-engagement of one of the pins 60 or 60'. A cable 84 is terminally secured to the front rack, as best illustrated in Figure 3, at points at the front and rear thereof and on the under side of the said rack. This cable is entrained in windlass fashion on the drums 52 and 54 and a pulley 86 is mounted on a short transverse brace 88 secured to the frame members 20, at a point considerably in front of the forward edge of the rear rack. One of the ends of the cable 84 is entrained over this pulley 86, in order that the same cable 84 may be used to force the front rack to move in both directions.

The operation of this invention will be clearly understood from the foregoing description of the mechanical details thereof, taken in connection with the recitation of the objects sought to be achieved by this invention. Ordinarily, the front rack will be moved to the rear of the implement before the commencement of loading the hay thereon, and this front rack will be completely filled before the same is moved to the front of the implement. The rear rack is then filled to complete the load of hay, which may then be transported to the barn or stack.

It will, of course, be understood that this invention need not be constructed entirely of metal and that other materials may be used to carry out the principles involved in this invention with minor variations in structure necessitated by such a change of material.

Though there has been described a particular embodiment of this invention, this application is not limited to this particular embodiment, but it is desired to limit this inventilon only in accordance with a proper interpretation of the appended claims.

Having described the invention, what is claimed as new is:

1. A hay loading device comprising a wagon frame having a pair of spaced longitudinally disposed channel members and ground contacting wheels, a front rack comprising a flat plate having channel members secured to the lower surface thereof and rearwardly and forwardly slidably mounted on said channel members, a rear rack rigidly mounted on said channel members and comprising a central bed plate and flat lateral apron members, and power means operated by one of said wheels for movement of said front rack rearwardly and forwardly.

2. A hay loading device comprising a wagon frame having ground contacting wheels, a front rack comprising a flat plate having channel members secured to the lower surface thereof and rearwardly slidably mounted on said frame, a rear rack rigidly mounted on said frame, power means operated by one of said wheels for movement of said front rack rearwardly and forwardly and automatic stop means for arresting said movement, said power means including a shaft mounted on the frame and operatively connected with one of said wheels for continuous rotation, a dual drum windlass freely rotatably mounted on said shaft and having a cable terminally secured at both ends to said front rack, pulley means on said frame forward of the front end of the rear rack to guide said cable, teeth on the outside ends of the dual drum windless, a pair of pins on said shaft on each side of the windlass, said windlass being slidable on said shaft so that said teeth engage said pins selectively and also so that neither pin is engaged, and manual control means for slidably shifting said windlass on said shaft.

3. A hay loading device comprising a wagon frame having ground contacting wheels, a front rack comprising a flat plate having channel members secured to the lower surface thereof and rearwardly slidably mounted on said frame, a rear rack rigidly mounted on said frame, power means operated by one of said wheels for movement of said front rack rearwardly and forwardly, manual control means for initiating said movement, and automatic stop means for arresting said movement, said power means including a shaft connected to one of the ground contacting wheels for continuous operation of the shaft, pins on said shaft, a dual drum windlass on said shaft and having teeth on the outer ends thereof for selective engagement with said pins and having a cable secured at both ends to said front rack, and a pulley positioned forwardly of the rear end of said front rack when said front rack is in forward position to guide said cable, said windlass being shiftable in an axial direction on said shaft for said engagement and for neutral positioning.

MILES H. ENGESSER.

REFERENCES CITED

The following references are of record in the file of this patent:

UNITED STATES PATENTS

| Number | Name | Date |
| --- | --- | --- |
| 992,778 | Ketcham | May 23, 1911 |
| 1,039,558 | Lyons | Sept. 24, 1912 |
| 1,093,304 | Willcox | Apr. 14, 1914 |
| 1,199,142 | Wurtz | Sept. 26, 1916 |
| 1,359,824 | Mullaney et al. | Nov. 23, 1920 |
| 1,418,997 | Wendel | June 6, 1922 |